United States Patent
Hutten et al.

(10) Patent No.: US 11,363,119 B1
(45) Date of Patent: Jun. 14, 2022

(54) REMOTE PROCESSING OF AUGMENTED REALITY WORKLOADS

(71) Applicant: Wormhole Labs, Inc., Huntington Beach, CA (US)

(72) Inventors: Curtis Hutten, Laguna Beach, CA (US); Robert D. Fish, Irvine, CA (US); Brian Kim, Walnut, CA (US)

(73) Assignee: Wormhole Labs, Inc., Sherman Oaks, CA (US)

( * ) Notice: Subject to any disclaimer, the term of this patent is extended or adjusted under 35 U.S.C. 154(b) by 0 days.

(21) Appl. No.: 17/111,422

(22) Filed: Dec. 3, 2020

(51) Int. Cl.
*H04L 67/131* (2022.01)
*G06T 19/00* (2011.01)
*H04L 41/50* (2022.01)

(52) U.S. Cl.
CPC ............ *H04L 67/38* (2013.01); *G06T 19/006* (2013.01); *H04L 41/5096* (2013.01)

(58) Field of Classification Search
CPC .... H04L 67/38; H04L 41/5096; G06T 19/006
USPC ........................................................ 709/224
See application file for complete search history.

(56) References Cited

U.S. PATENT DOCUMENTS

| | | | |
|---|---|---|---|
| 8,041,940 B1 | 10/2011 | Natanzon et al. | |
| 8,108,501 B2 | 1/2012 | Birnie et al. | |
| 8,654,868 B2 | 2/2014 | Jacobs et al. | |
| 8,909,771 B2 | 12/2014 | Heath | |
| 8,930,690 B2 | 1/2015 | Zuo et al. | |
| 2003/0158906 A1 | 8/2003 | Hayes | |
| 2014/0081881 A1 | 3/2014 | Radhakrishnan | |
| 2015/0188984 A1* | 7/2015 | Mullins | G06T 19/006 709/219 |
| 2019/0158609 A1 | 5/2019 | Higgins et al. | |
| 2019/0266015 A1* | 8/2019 | Chandra | G06F 9/4887 |
| 2020/0117899 A1* | 4/2020 | Rogness | G01G 19/02 |
| 2020/0374974 A1* | 11/2020 | Sun | H04L 63/105 |

\* cited by examiner

*Primary Examiner* — Wing F Chan
*Assistant Examiner* — Leon Y Tseng
(74) *Attorney, Agent, or Firm* — Fish IP Law, LLP (57) ABSTRACT

In a method of distributing augmented reality workloads, a task module receives an augmented reality task. The task module identifies at least one workload and at least one workload parameter, wherein the workload comprises sensor data from one or more sensors. The task module determines whether a local processor is available and meets the workload parameters associated with the augmented reality task. If task module determines that the local processor does not meet at least one workload parameter, task module determines whether one or more remote processors meet the at least one workload parameter. The task module sends one or more workloads to any capable remote processors.

10 Claims, 4 Drawing Sheets

REMOTE PROCESSING OF AUGMENTED REALITY WORKLOADS

FIELD OF THE INVENTION

The field of the invention is management of mixed reality environments.

BACKGROUND

The inventive concepts herein aim to use remote processing power to power augmented reality-based experiences.

Specifically, the present invention provides a system of offloading processing workloads to power augmented reality experiences including user interactions with the environment and other users. Augmented reality experiences present unique processing challenges because of the number and nature of data processing workloads that come with the implementation of user interface, graphical effects, and numerous other calculations required to enable an interactive and shared augmented reality environment.

In conventional systems, powerful combinations of graphical processing units (GPUs) and central processing units (CPUs) are directly included or connected to displays enabling augmented reality experiences. The presently claimed invention enables augmented-reality environments to be displayed to a user while allowing the user to walkabout the augmented reality environment naturally. To achieve a more seamless augmented reality experience, the present invention enables augmented reality workloads to be offloaded to significantly more powerful CPUs and/or GPUs to then be streamed to a wirelessly connected display and interface. In some embodiment, the display and interface can be physically coupled to the remote CPUs and GPUs. For example, a small wearable computing device can be hardwired to a head-mounted display to enable a mobile augmented reality experience.

It is contemplated the invention described herein anticipates the technical challenges presented by changing computing landscape, which increasingly prioritizes mobility to achieve seamless user experiences. For example, the smartphone has required the development of correspondingly cutting-edge technologies to pack processing power down to the smallest volume possible at any one or more given price points.

Augmented reality environments require significantly more processing power to create seamless experiences. Some of the additional challenges include, but are not limited to preservation of a high level of graphical integrity, minimization of latency, management of sophisticated software and hardware platforms, and processing of data from a combination of sensors and associated sensor software. As augmented reality platforms dynamically process data in unpredictable environments, conventional processing platforms, such as those found in smartphone-based augmented reality technology, fail to provide seamless real-time experiences. Where conventional systems today have relatively static variables, such as the coordination between a camera and software to create an augmented reality overlay, augmented reality systems will be integrated into far more complex platforms with specialized sensors, such as LIDAR sensors, infrared sensors, optical sensors, sound sensors, tactile sensors, taste sensors, and electronic nose sensors, for detecting the environment about the user.

U.S. Pat. No. 8,654,868 B2 to Jacobs teaches offload processing for a wireless device, which comprises a first device, a second device, and a wireless communication link, such as a headset, a phone, and a Bluetooth® connection. Jacobs contemplates the decoding and compressing of data by a device, such as a smartphone, to simplify a headset or other compatible device by removing onboard processing. However, Jacobs merely contemplates audio technologies, such as noise-cancellation and other waveform-based audio processing, to be completed on a remote processor. Jacobs fails to contemplate the coordination of multiple sensor modules capturing a variety of different sensory data and the additional processing required to layer that data to create a walkabout reality experience based on the primary user, the environment, and the secondary users characteristics and preferences.

US Patent Application Pub. No. 2003/0158906 to Hayes teaches offloading of conventional processing tasks. However, Hayes similarly fails to contemplate the offloading of processing tasks particular to the new challenges created by augmented reality systems. Hayes fails to contemplate the processing of data from a multitude of cooperating sensors to be displayed in substantially real-time to a user.

In gaming, it is generally known that players can move between virtual spaces by teleporting. However, these game worlds are largely tied to predetermined structures, limited customization specific to the game, and linked to other preselected areas. For example, a game such as The Sims™ allows users to engage with each other in a shared virtual space with each home built and accessorized using an in-game engine. Unlike The Sims™, the inventive concept herein contemplates a highly customizable mixed reality space that can link to any number of other customized mixed reality spaces. The present invention also contemplates enabling users to tie customizable functions, avatar appearances, and environmental features/effects.

Jacobs, Hayes, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for processing systems that are uniquely adapted to handle the complex workloads associated with rendering multisensory data into a seamless augmented walkabout reality experience.

SUMMARY OF THE INVENTION

The inventive concept herein contemplates virtual reality, augmented reality, and/or mixed reality environments that are highly customizable with various interactive elements. It is contemplated that the interactive elements can be at least partially customized by a task module associated with one or more mixed reality spaces. It is further contemplated that the task module can analyze the context of a user's environment using a combination of data sources and alter any one or more of a user's environment, avatar, and sensory effects (e.g., visual, olfactory, and auditory effects) accordingly.

The present invention contemplates that a task module receives an augmented reality task. The task module identifies at least one workload and at least one workload parameter, wherein the workload comprises sensor data from one or more sensors. The task module determines whether a local processor is available and meets the workload parameters associated with the augmented reality task. If task module determines that the local processor does not meet at least one workload parameter, task module determines whether one or more remote processors meet the at least one workload parameter. The task module sends one or more workloads to any capable remote processors.

Modification to the user's virtual environment are contemplated to include both environmental features as well as the features associated with the user. For example, the user's virtual environment can include both the actual surroundings and the appearance of the user's avatar.

Various resources, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer-based scheduling system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including allowing users to access mixed reality environments. Mixed reality environments can include any combination of virtual and augmented reality environments and can be connected to each other in any manner.

For the purposes of this application, sub-environments can comprise any one or more of an augmented reality, a virtual reality, and any other interactive media format. For example, a primary sub-environment can be a first augmented reality, and a secondary sub-environment can be a second augmented reality connected to the first through a portal.

For the purposes of this application, "portal" or any similar terms, such as "portalling" and "portalled" mean any connected between environments. Portals can be in the form of interactive objects, designated spaces, or any other form that allows a user to connect to other augmented realities and/or virtual realities.

As used herein, "local" or any similar terms describe elements that can be directly tied to a workload and the initial computer processing steps associated with the workload. For example, a smartphone in the hands of a user includes a local processor because the smartphone directly receives information from the smartphone camera and processes the corresponding imaging data. In another example, an array of sensors and a computer linked via WiFi may be considered local because each sensor and the computer directly capture a subject and execute computer processes associated with that data.

As used herein, "remote" or any similar terms describe elements that are not directly tied to a workload. For example, a computer server used for offloading data processing tasks and data storage can be considered remote. In another example, a cloud computing infrastructure used to process tasks received from a user device by dividing the tasks and sending them wirelessly to multiple computer servers, can be considered remote.

In some embodiments, "local" and "remote" may be predefined. For example, a user may designate a first group of devices as local and a second group of devices as remote.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
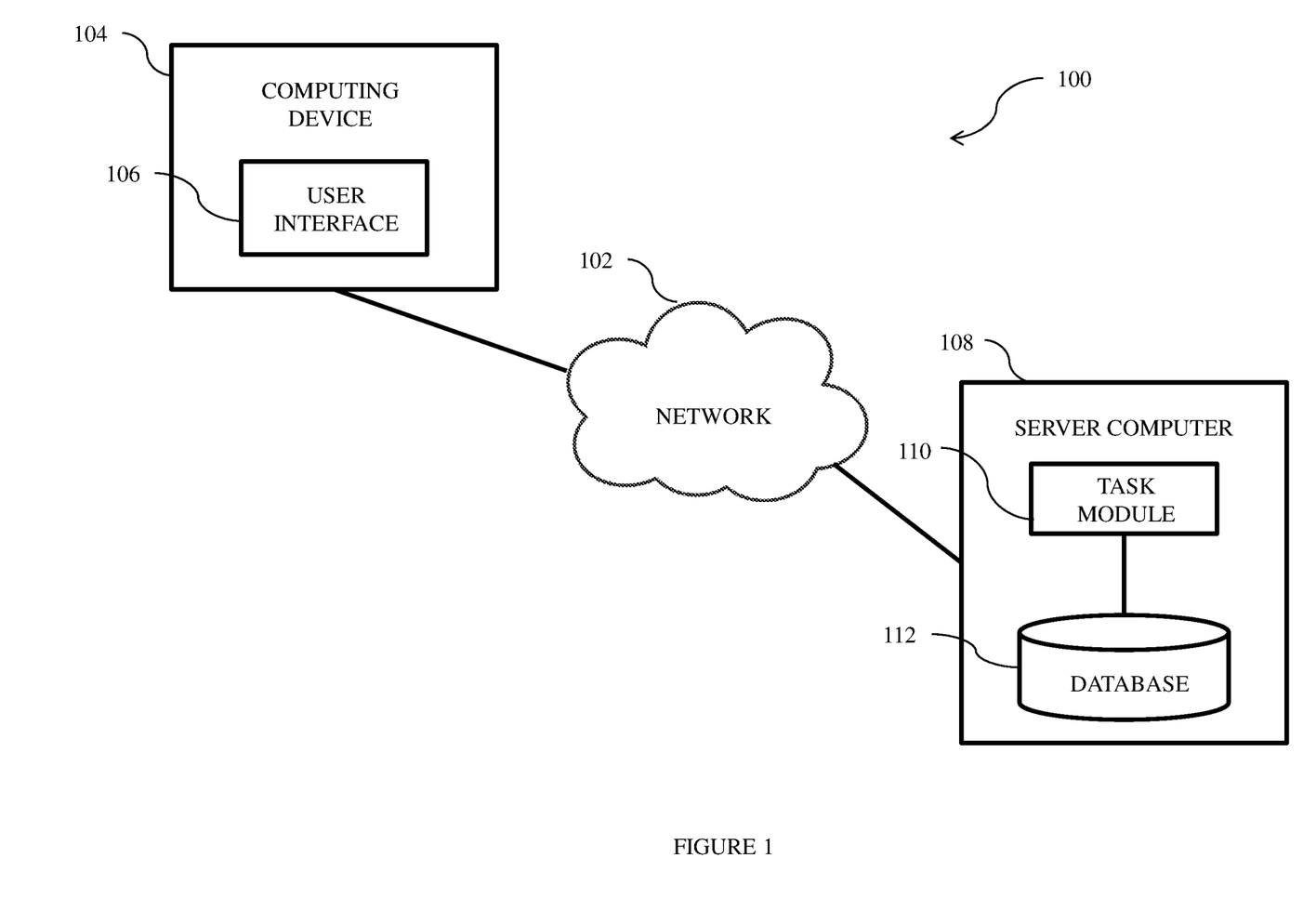
FIG. 1 is a functional block diagram illustrating a distributed data processing environment.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104, server computer 108, and any other computing devices (not shown) within distributed data processing environment 100.

It is contemplated that computing device 104 can be any programmable electronic computing device capable of communicating with various components and devices within distributed data processing environment 100, via network 102. It is further contemplated that computing device 104 can execute machine readable program instructions and communicate with any devices capable of communication wirelessly and/or through a wired connection. Computing device 104 includes an instance of user interface 106.

User interface 106 provides a user interface to task module 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure task module 110 (discussed in more detail below) to enable a user to access a mixed reality space. It is contemplated that user interface 106 can allow a user to provide any information to task module 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by task module 110. In the depicted embodiment, task module 110 resides on server computer 108. However, database 112 can reside anywhere within a distributed data processing environment provided that task module 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
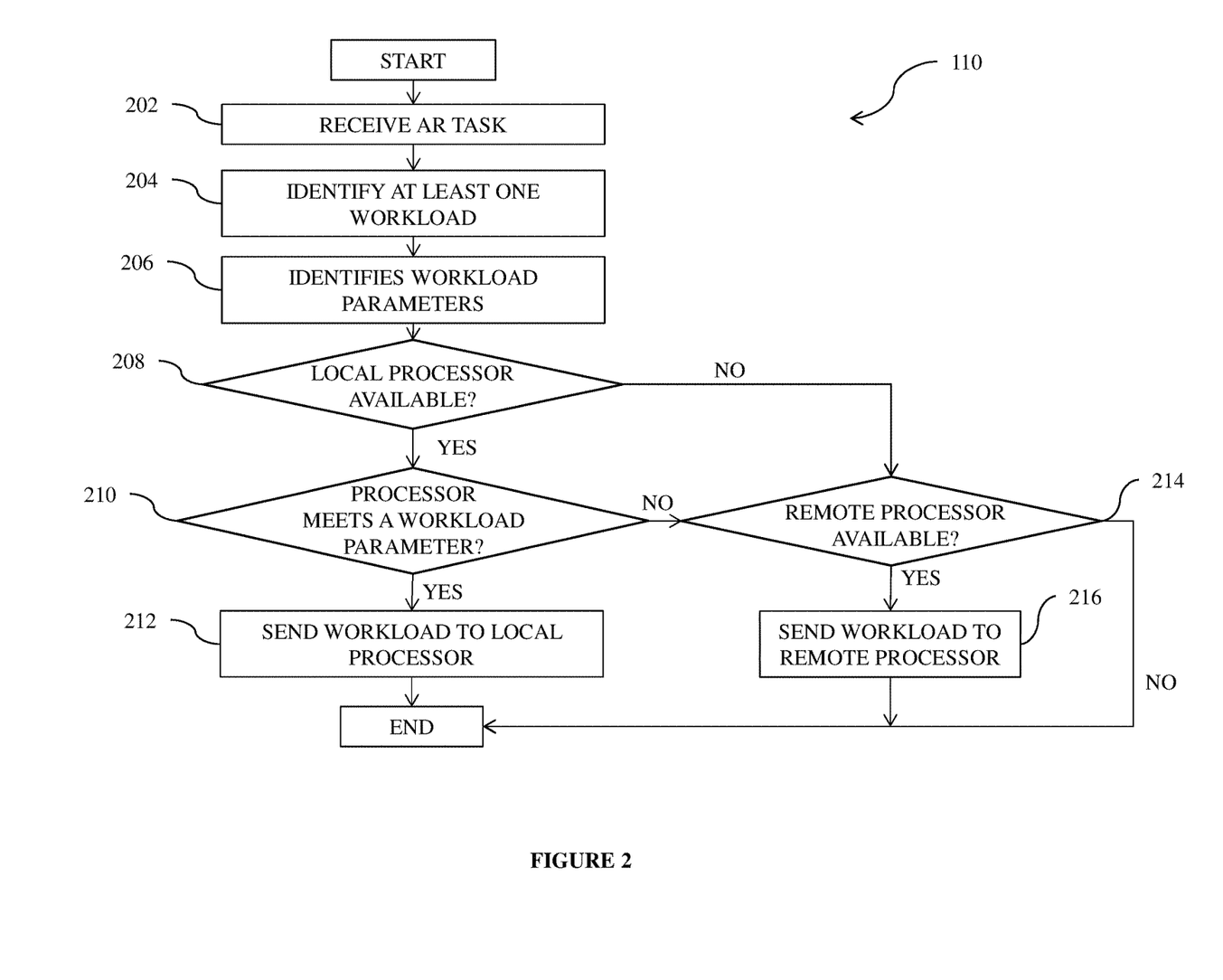
FIG. 2 is a schematic of a method of distributing processing tasks between remote and local processors for augmented reality-based tasks.

FIG. 2 is a schematic of a method of distributing processing tasks between remote and local processors for augmented reality-based tasks.

Task module 110 receives one or more augmented reality ("AR") tasks (step 202).

AR tasks can include any tasks associated with a walkabout reality, such as augmented reality tasks and virtual reality tasks. For example, an AR task can include the rendering of virtual elements within the backdrop of a real environment. In another example, an AR task can include the processing of data for rendering by a graphics processing unit ("GPU"). In yet another example, an AR task can include processing of data for background tasks that are not visually rendered.

Task module 110 can receive the one or more AR tasks in any manner known in the art. For example, task module 110 can receive AR tasks through network 102. In another example, task module 110 can receive AR tasks from a local arithmetic-logic-unit ("ALU" of a local CPU and local database.

Task module 110 identifies at least one workload associated with the AR task (step 204).

Task module 110 identify workloads in any manner known in the art. For example, task module 110 can identify one or more preset workloads associated with a particular task. In another example, task module 110 can determine how to divide and distribute workloads dynamically. In yet another example, task module 110 can identify a first preset workload and determine a second workload based on the current parameters, such as processing power availability, latency requirements, and type of processors required for a task.

Task module 110 identifies one or more workload parameters (step 206).

Workload parameters can include any variables associated with processing tasks. In one embodiment, workload parameters are associated with remote processors. For example, workload parameters can include the availability of remote processors, the processing power available through remote processors, and the latency associated with the distance between the rendering medium and the remote processor. In another embodiment, workload parameters are associated with local processors.

Task module 110 determines whether a local processor is available (decision block 208).

Task module 110 can determine whether local processors are available in any manner known in the art.

In one embodiment, task module 110 can communicate with other computer systems to determine how much remote processing power is available. For example, task module 110 can use machine-to-machine ("M2M") communications to communicate with remote servers and determine which tasks to send to a remote processor.

In one embodiment, task module 110 can determine whether at least one of a local processor and a remote processor is available to complete a task by assigning an identifier corresponding to at least a portion of the task and an identifier corresponding to the local or remote processor completing the task. For example, task module 110 can a first task identification number ("ID") to a first workload of a first task processed by a local processor and a second task ID to a second workload of the first task processed by a remote processor. In this way, task module 110 can keep track of different portions of tasks that are divided and processed separately. It is contemplated that a task ID can include any means of identifying and differentiating tasks.

In another embodiment, task module 110 shares the identifier with a remote monitoring engine, such as a remote resource management engine, such that the completed tasks are aggregated in substantially real time by the remote monitoring engine.

Task module 110 can record the resource consumption of one or more processors or processor cores by using a performance monitoring interrupt. As such, task module can receive a snapshot of the current task completion and processor use metrics. For example, a task module 110 can be programmed to initiate a performance monitoring interrupt at a predetermined time interval. In this example, task module 110 can execute a periodic sampling of the software execution state at least one of a processor and a processor core by interrupting the normal execution flow at consistent intervals.

In another embodiment, task module 110 records resource consumption data and uses the resource consumption data to dynamically alter performance monitoring interrupt parameters. For example, task module 110 can determine that resource consumption per processor is low and increase the time interval between each performance monitor interrupt. It is contemplated that dynamic adaptation to resource consumption data can increase the efficiency of the present invention by reducing excess energy consumption.

In another embodiment, task module 110 can automatically determine that a local processor is available. For example, task module 110 can automatically determine that a remote server, such as a private computer in the same room as a user, is available to process tasks. Remote servers can include any remote processing unit that is not physically connected to a rendering device, such as a display that streams a video or a display tied to one or more local processors.

In response to determining that a local processor is available ("YES" branch, decision block 208), task module 110 determines whether the local processor meets at least one workload parameter (decision block 210).

Local processors can be any processors that are physically connected to a rendering medium. For example, a local processor can include an ARM processor in a virtual reality headset. In another example, a local processor can include a processor in an augmented reality headset. In yet another example, a local processor can include a processor in a smartphone.

Workload parameters can include any variables associated with processing tasks. In one embodiment, workload parameters are associated with remote processors. For example, workload parameters can include the availability of remote processors, the processing power available through remote processors, and the latency associated with the distance between the rendering medium and the remote processor. In another embodiment, workload parameters are associated with local processors.

In one embodiment, task module 110 determines that a local processor meets all the workload parameters. For example, task module 110 can determine that the local processor in a smartphone has sufficiency graphical processing power to render three-dimensional models to overlay on a quick response code ("QR code") in an augmented reality environment. In another example, task module 110 can determine that the CPU in a VR headset has sufficient power to render a virtual reality environment.

In another embodiment, task module 110 determines that a local processor meets part of all the workload parameters. For example, task module 110 can determine that a smartphone processor can render all of the graphical user interface ("GUI") elements but has insufficient power to render more detailed three-dimensional ("3D") models.

It is contemplated that task module 110 can divide up tasks in any manner in the art to complete the AR task. Task module 110 can send out workloads for partial or complete remote processing and use local processing power to complete the final steps to render a workload. For example, rendering of a large 3D model can be divided into individual parts and sent to remote processors, which can then be assembled into a cohesive unit with animations using a local processor. This feature can provide various advantages, such as reducing latency for timing critical AR tasks, such as the location of a crosshair in an FPS game while offloading the processing of background effects to a remote GPU for streaming to the user.

In response to determining that a local processor meets the at least one workload parameter ("YES" branch, decision block 210), task module 110 sends the one or more workloads to the local processor (decision block 212).

As stated above, local processors can be any processors that are physically connected to a rendering medium. For example, a local processor can include an ARM processor in a virtual reality headset. In another example, a local processor can include a processor in an augmented reality headset. In yet another example, a local processor can include a processor in a smartphone.

In response to determining that a local processor is available ("NO" branch, decision block 208), task module 110 determines whether at least one remote processor is available (decision block 214).

Task module 110 can determine that at least one remote processor is available through any medium known in the art. In one embodiment, task module 110 sends a query to a resource controller that manages a set of remote server systems. For example, task module 110 can send a query to a resource controller associated with a server farm in a remote location. In another embodiment, task module 110 can automatically determine which remote processors are available based on predetermined remote processing settings. For example, task module 110 can determine that one of four dedicated remote processing systems is ideal for the current workload.

In response to determining that a local processor does not meet the at least one workload parameter ("NO" branch, decision block 210), task module 110 determines whether at least one remote processor is available (decision block 214).

In response to determining that a remote processor is available ("YES" branch, decision block 214), task module 110 sends the workload to the remote processor and ends (step 216).

In some instances, the remote processors may not meet the at least one workload parameter. When the remote processors do not meet the at least one workload parameter, task module ends. However, it is contemplated that the remote processors have processing power that is greater than local processing. For example, remote processors can include a collection of remote servers with high levels of raw graphical and data processing capabilities and a local processor can be an advanced RISC machine (ARM) processor.

In some embodiments, task module 110 may allocate workloads to at least one of a remote processor and a virtual machine. When task module 110 assigns a workload to a virtual machine, task module 110 can associate the workload and the virtual machine assigned to the workload with the resource consumption of processors or processor cores.

In one embodiment, task module 110 determines resource consumption at periodic time intervals in a uniform time scale in a rolling buffer. For example, task module 110 may record a rolling buffer identifying the resource consumption of a workload and the virtual machine processing the workload at ten millisecond intervals. However, task module 110 is not limited to the time interval in the aforementioned example and may record resource consumption using a different time interval.

In another embodiment, task module 110 associates a workload and the virtual machine assigned to the workload with the resource consumption of processors or processor cores at a predetermined amount of processor events using an event performance monitoring interrupt. A processor event is an event that causes a state transition, except when an event occurs as a result of an exit action. In yet another embodiment, task module 110 may associate a virtual I/O server to a workload to incorporate I/O data into the resource consumption estimate of the processor or processor cores.

In response to determine that a remote processor is not available ("NO" branch, decision block 214), task module 110 ends.

Figure 3:
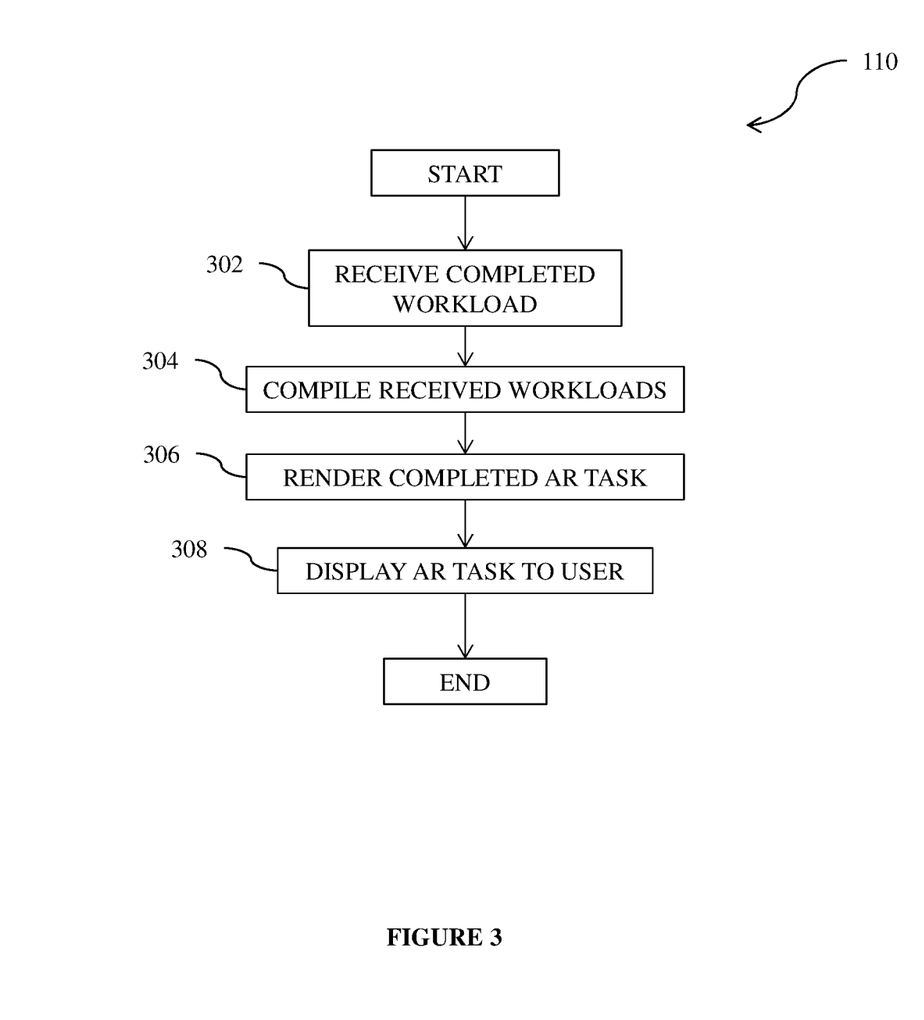
FIG. 3 is a schematic of a method of displaying processed workloads to a user.

FIG. 3 is a schematic of a method of displaying processed workloads to a user.

Task module 110 receives a completed workload (step 302).

A completed workload can include any processed data. In one embodiment, a completed workload includes algorithmic calculations that at least partially assist in rendering a visual representation of a three-dimensional environment. For example, a completed workload can comprise instructions sent to a display to render a particular color in each pixel to coincide with how the light should appear in the user's perspective. The user's perspective can be represented in any one or more ways including, for example, any one or more points in a 3D space.

Workloads are contemplated to include dynamic calculations from spontaneous user actions. For example, workloads can include algorithmic calculations corresponding any one or more effects associated with the user's interaction with other users and the 3D environment including, for example, movement, sounds, tactile feedback, visual effects, and any calculable effect.

Data processed by workloads can be sourced from any available data source. In one embodiment, task module 110 sources data for one or more workloads from one or more sensors. In doing so, task module 110 can create workloads to quickly render visual and auditory effects from dynamic real-world events. For example, task module 110 can use a combination of a LIDAR sensor, optical sensor, and microphone to analyze a dog running into the user's view and overlaying a dynamic visual of the user's in-game virtual dog and overlaying audio effects associated with the in-game virtual dog.

Task module 110 compiles received workloads (step 304).

Task module 110 renders a completed AR task (step 306).

Task module 110 can render complete AR tasks in any manner and using any modality available in the art. In one embodiment, task module 110 renders completed AR tasks in a wearable display device. For example, task module 110 can render a completed AR task using an augmented reality headset. In another example, task module 110 can render a completed AR task using a virtual reality headset.

In other embodiments, task module 110 renders completed AR tasks in a handheld display device. For example, task module 110 can render a completed AR task in a user's smartphone.

Task module 110 displays the completed AR task to a user (step 308).

Figure 4:
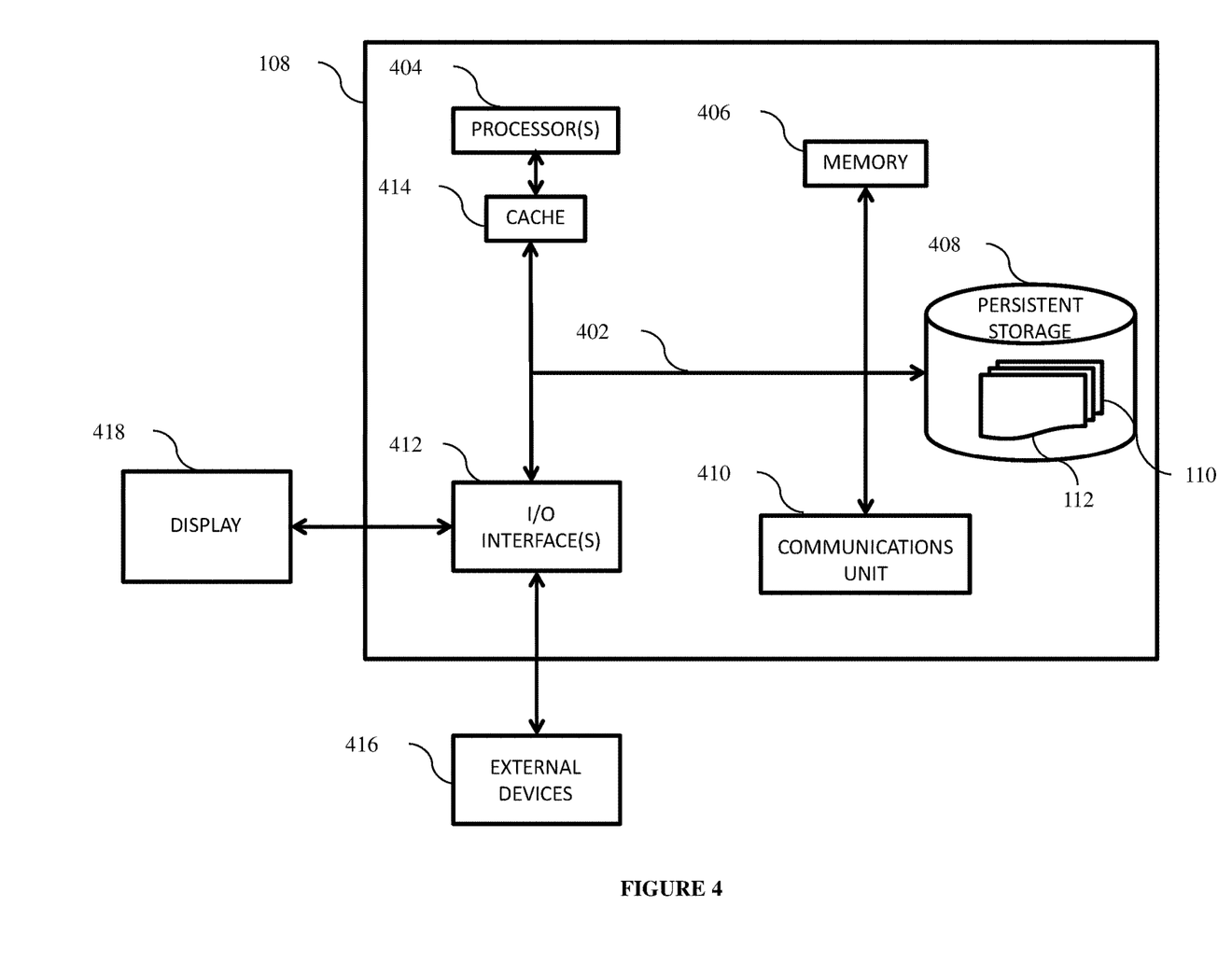
FIG. 4 depicts a block diagram of components of the server computer executing the mixed reality engine within the distributed data processing environment of FIG. 1.

FIG. 4 depicts a block diagram of components of the server computer executing the banking engine 110 within the distributed data processing environment of FIG. 1. FIG. 4 is not limited to the depicted embodiment. Any modification known in the art can be made to the depicted embodiment.

In one embodiment, the computer includes processor(s) 404, cache 414, memory 406, persistent storage 408, communications unit 410, input/output (I/O) interface(s) 412, and communications fabric 402.

Communications fabric 402 provides a communication medium between cache 414, memory 406, persistent storage 408, communications unit 410, and I/O interface 412. Communications fabric 402 can include any means of moving data and/or control information between computer processors, system memory, peripheral devices, and any other hardware components.

Memory 406 and persistent storage 408 are computer readable storage media. As depicted, memory 406 can include any volatile or non-volatile computer storage media. For example, volatile memory can include dynamic random-access memory and/or static random-access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 406 and persistent storage 408 are random access memory and a hard drive hardwired to computing device 404, respectively. For example, computing device 404 can be a computer executing the program instructions of task module 110 communicatively coupled to a solid-state drive and DRAM.

In some embodiments, persistent storage 408 is removable. For example, persistent storage 408 can be a thumb drive or a card with embedded integrated circuits.

Communications unit 410 provides a medium for communicating with other data processing systems or devices, including data resources used by computing device 104. For example, communications unit 410 can comprise multiple network interface cards. In another example, communications unit 410 can comprise physical and/or wireless communication links.

It is contemplated that task module 110, database 112, and any other programs can be downloaded to persistent storage 408 using communications unit 410.

In a preferred embodiment, communications unit 410 comprises a global positioning satellite (GPS) device, a cellular data network communications device, and short to intermediate distance communications device (e.g., Bluetooth®, near-field communications, etc.). It is contemplated that communications unit 410 allows computing device 104 to communicate with other computing devices 104 associated with other users.

Display 418 is contemplated to provide a mechanism to display information from task module 110 through computing device 104. In preferred embodiments, display 418 can have additional functionalities. For example, display 418 can be a pressure-based touch screen or a capacitive touch screen.

In yet other embodiments, display 418 can be any combination of sensory output devices, such as, for example, a speaker that communicates information to a user and/or a vibration/haptic feedback mechanism. For example, display 418 can be a combination of a touchscreen in the dashboard of a car, a voice command-based communication system, and a vibrating bracelet worn by a user to communicate information through a series of vibrations.

It is contemplated that display 418 does not need to be physically hardwired components and can, instead, be a collection of different devices that cooperatively communicate information to a user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of offloading augmented reality workloads to remote processors, comprising:
   receiving sensor data from a sensor array communicatively coupled to an augmented reality device, wherein the sensor array includes a camera;
   determining an augmented reality objective;
   determining an augmented reality workload and an augmented reality workload parameter based on the augmented reality objective;
   determining whether a local processor is available;
   responsive to determining that a local processor is available, periodically determining whether the local processor meets the augmented reality workload parameter by using a performance monitoring interrupt during a normal flow of execution of the augmented reality workload;
   responsive to determining that the local processor does not meet the augmented reality workload parameter, determining during the performance monitoring interrupt whether one or more remote processors meet the augmented reality workload parameter; and responsive to determining that the one or more remote processors meet the augmented reality workload parameter, sending the workload and the sensor data to the remote processor.

2. The method of claim 1, further comprising:

responsive to determining that the local processor meets at least a portion of the augmented reality workload parameter, determining whether a remote processor is available;

responsive to determining that the remote processor is available, sending a first portion of the augmented reality workload to the local processor and a second portion of the augmented reality workload to the remote processor.

3. The method of claim 1, further comprising communicating one or more completed augmented reality workloads to a wireless communication module coupled to the local processor.

4. The method of claim 1, wherein the local processor includes multiple processors operatively coupled together.

5. The method of claim 4, wherein the multiple processors are remotely coupled to each other.

6. The method of claim 5, wherein a first processor of the multiple processors is coupled to a remote sensor.

7. The method of claim 4, further comprising;

receiving at least one completed augmented reality workload;

compiling the at least one completed augmented reality workload; and rendering an augmented reality output associated with the augmented reality objective.

8. The method of claim 7, further comprising;

receiving a user input associated with the augmented reality workload;

modifying the augmented reality objective in response to the user input;

executing one or more program instructions associated with the modified augmented reality objective; and rendering a modified augmented reality output.

9. The method of claim 7, wherein the augmented reality output includes at least one of the group consisting of: a rendered visual output; an audio output, and a haptic output.

10. The method of claim 8, wherein the modified augmented reality output includes at least one of the group consisting of: a rendered visual output; an audio output, and a haptic output.

* * * * *